United States Patent

Krutzsch et al.

Patent Number: 5,851,501
Date of Patent: Dec. 22, 1998

[54] PROCESS FOR ABSORBING AND DESORBING NITROGEN OXIDES IN EXHAUST GASES

[75] Inventors: Bernd Krutzsch, Denkendorf; Andrea Seibold, Blaustein-Arnegg; Leonhard Walz, Neu-Ulm; Walter Boegner, Remseck; Martina Heinau, Ulm; Martin Hartweg, Erbach; Brigitte Konrad, Kornwestheim, all of Germany

[73] Assignee: Daimler-Benz AG, Stuttgart, Germany

[21] Appl. No.: 645,008

[22] Filed: May 9, 1996

[30] Foreign Application Priority Data

May 9, 1995 [DE] Germany ............... 196 16 920.4

[51] Int. Cl.⁶ ............................................. B01D 53/56
[52] U.S. Cl. ............................. 423/213.2; 423/239.1
[58] Field of Search ............... 423/239.1, 213.5, 423/213.2

[56] References Cited

U.S. PATENT DOCUMENTS

| | | | |
|---|---|---|---|
| 4,182,694 | 1/1980 | Lauder | 423/213.5 |
| 4,200,554 | 4/1980 | Lauder | 423/213.5 |
| 5,241,191 | 8/1993 | Agostinelli et al. | 505/1 |
| 5,380,692 | 1/1995 | Nakatsuji et al. | 502/303 |
| 5,457,958 | 10/1995 | Boegner et al. | 60/279 |

FOREIGN PATENT DOCUMENTS

| | | |
|---|---|---|
| 0 416 545 A2 | 3/1991 | European Pat. Off. . |
| 0 467 526 | 1/1992 | European Pat. Off. . |
| 0 470 728 | 2/1992 | European Pat. Off. . |
| 0 540 280 A1 | 5/1993 | European Pat. Off. . |
| 0 664 147 A2 | 7/1995 | European Pat. Off. . |
| 1-104345 | 4/1989 | Japan ................ 423/239.1 |
| 1-245851 | 10/1989 | Japan ................ 423/239.1 |
| 1-307431 | 12/1989 | Japan ................ 423/239.1 |
| 4-161221 | 6/1992 | Japan ................ 423/239.1 |
| 4-161222 | 6/1992 | Japan ................ 423/239.1 |
| 2 206 877 | 1/1989 | United Kingdom . |
| 90/08589 | 8/1990 | WIPO ................ 423/239.1 |
| 95/09047 | 6/1995 | WIPO . |

OTHER PUBLICATIONS

Arakawa, T., et al. "The Direct Reaction Between Nitric Oxide and the Superconductor . . . ", Materials Res. Bulletin, vol. 24, pp. 529–534, 1989.

Derwent WPI Abstract of JP 04 161222A, First Published Jun. 4, 1992.

Derwent WPI Abstract of JP 04 161221A, First Published Jun. 4, 1992.

Derwent WPI Abstract of JP 04 100542A, First Published Apr. 2, 1992.

Abstract of DE 4319294 (See counterpart US 5,457,958), May 19, 1994.

*Primary Examiner*—Michael Lewis
*Assistant Examiner*—Peter DiMauro
*Attorney, Agent, or Firm*—Evenson, McKeown, Edwards & Lenahan P.L.L.C.

[57] ABSTRACT

A material and a process for adsorbing and desorbing nitrogen oxides in exhaust gas systems of engines running on a lean mixture, which does not require a prior oxidation step, wherein a mixed oxide which has an oxygen-rich orthorhombic structure is used which changes to an oxygen-poor tetragonal structure as a function of temperature.

6 Claims, 1 Drawing Sheet

PROCESS FOR ABSORBING AND DESORBING NITROGEN OXIDES IN EXHAUST GASES

BACKGROUND AND SUMMARY OF THE INVENTION

The present invention relates to a material for adsorbing and desorbing nitrogen oxides in exhaust gases, particularly from internal combustion engines of motor vehicles, with a mixed oxide containing a d element, and to a process for adsorbing and desorbing these nitrogen oxides.

European Patent No. EP 540,280 discloses an apparatus for reducing the amount of nitrogen oxides in exhaust gases of internal combustion engines. The apparatus contains a mixed oxide based on Ba—Cu—O as the material for adsorbing and desorbing the nitrogen oxides. The method disclosed is useful particularly for the denitrification of the exhaust gases of gasoline engines operated on a lean mixture, the nitrogen oxides being stored in the form of nitrates after having been oxidized from NO to $NO_2$ in a preceding oxidation step. When the engine is operated with a rich mixture where $\lambda < 1$, the nitrates react with hydrocarbons. In this case, noble metal additives are required.

In this respect, $\lambda$ refers to the oxygen ratio which is the ratio of the amount of oxygen actually supplied for the combustion to the theoretical oxygen requirement. Therefore, at temperatures below 450° C., if $\lambda < 1$, a rich mixture, which favors desorption, is obtained. If $\lambda = 1$, then the amount of oxygen supplied is equal to the theoretical oxygen requirement, such that a complete combustion occurs. If $\lambda > 1$, an excess of oxygen is obtained, and the resulting mixture is lean with a predominately adsorptive effect. At temperatures above 450° C., adsorption decreases considerably, even in the presence of an excess amount of oxygen. Therefore, desorption is greatly influenced by an increase in temperature. However, below temperatures from 450°–500° C., adsorption and desorption are primarily controlled by the oxygen content.

It is an object of the present invention to provide a material and a method for adsorbing and desorbing nitrogen oxides in exhaust gases which is less expensive and more environmentally friendly.

This objective is achieved by providing a material for adsorbing and desorbing nitrogen oxides in exhaust gases, particularly from internal combustion engines of motor vehicles, with a mixed oxide containing a d element, and a process for adsorbing and desorbing these nitrogen oxides.

In this case, the d element may be scandium, titanium, vanadium, chromium, manganese, iron, cobalt, nickel or copper.

This objective is further achieved for the material according to the present invention by the fact that a mixed oxide has an oxygen-rich orthorhombic structure which changes into an oxygen-poor tetragonal structure as a function of temperature. For the present process, the objective is accomplished because such a material is used for adsorbing and desorbing the nitrogen oxides. Because of the selected material, it is possible to bind the nitrogen oxides directly into the mixed oxide without a prior oxidation step and therefore without prior formation of nitrate. As a result, noble metals are not required to convert the nitrates with hydrocarbons during the desorption phase, and consequently the cost is reduced. Furthermore, because sulfur, present in the exhaust gas, is easily oxidized by noble metals to sulfate, the catalyst material can become contaminated. The fact that the present invention does not require the use of noble metal additives therefore also ensures a decreased sulfate formation, which results in a better compatibility with the environment and less contamination of the catalyst material.

In a preferred embodiment, a cuprate is provided as the mixed oxide. With such compounds, it is possible to influence the absorption and desorption by changing the oxygen content in the exhaust gas.

In a further preferred embodiment, the mixed oxide is $AB_2C_{2+x}D_xO_{7+\delta}$, where A is Y, La, Pr, Nd, Sm, Gd, Dy, Ho, Tb, Yb, Lu, Er or Tm; B is Ba; C is Cu, Fe or Co; D is Cu, Fe, Co, Ni or Al; $0 \leq x \leq 1$; and $-1 \leq \delta \leq 0$.

In a further preferred embodiment, the mixed oxide is $YBa_2Cu_3O_{7-X}$, with $0 \leq X \leq 1$. This yttrium-barium-copper oxide is particularly suitable because, when loaded with nitrogen oxides, it changes from an oxygen-rich orthorhombic $YBa_2Cu_3O_7$ structure into an oxygen-poor tetragonal $YBa_2Cu_3O_6$ structure. The material does not decompose in the loaded state, and the stored NO is desorbed again almost completely. The change of the orthorhombic structure into the tetragonal crystalline structure leads to a formal decrease in the oxidation state of the copper, which changes from +3 in the case of $YBa_2Cu_3O_7$ to +2 in the case of $YBa_2Cu_3O_{6.5}$ and to +1 in the case of $YBa_2Cu_3O_6$. The crystalline structure has orthorhombic symmetry when X is between 0 and 0.64 and tetragonal symmetry when X is greater than 0.64.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
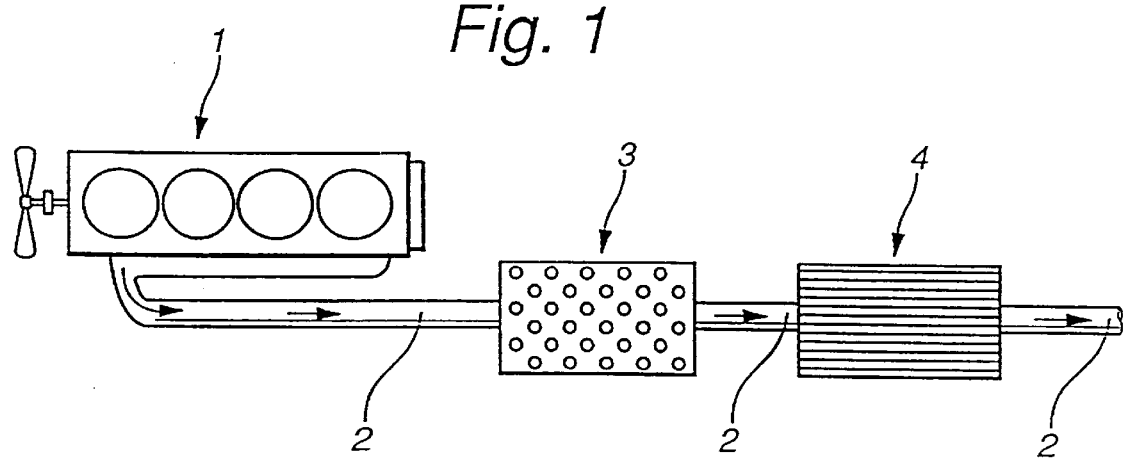
FIG. 1 is a diagram showing an example of a system used for purifying the exhaust gases of a motor vehicle engine operating on a lean mixture.
Figure 2:
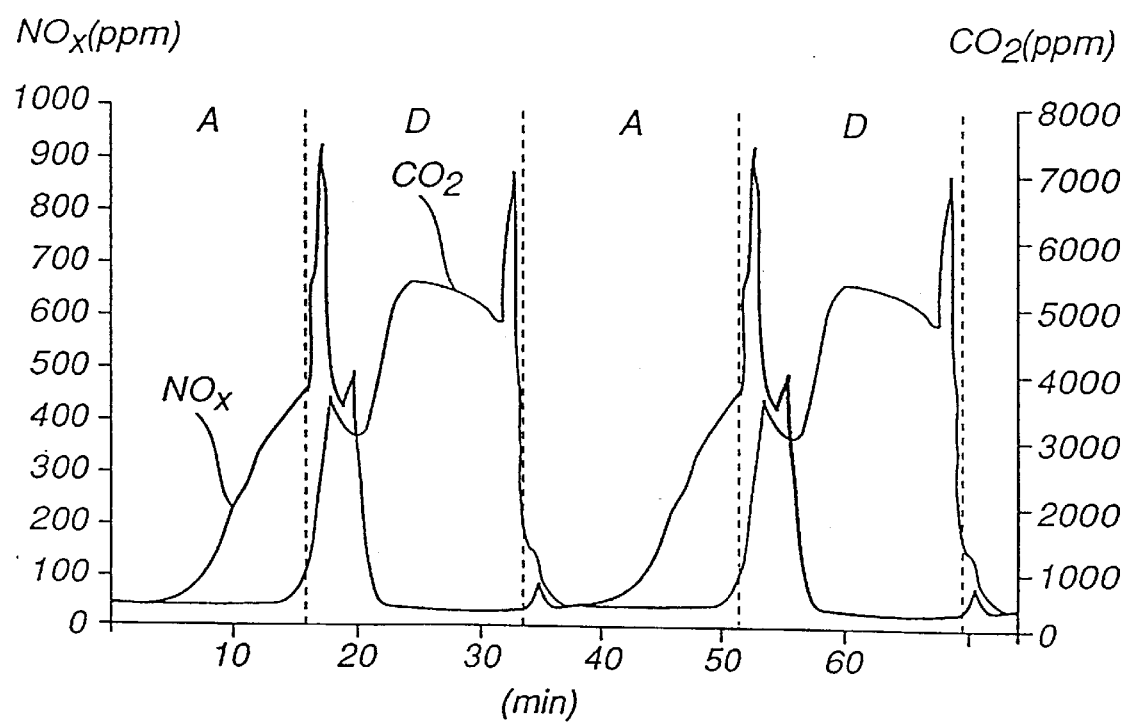
FIG. 2 is a graph of several adsorption and desorption cycles of a test system set up according to the diagram in FIG. 1.

An internal combustion engine (1) of a motor vehicle, which is operating on a lean mixture, is provided with an exhaust system (2), in which an adsorber (3) and a three-way catalyst (4) are connected in series. The suitability of a yttrium barium copper oxide $YBa_2Cu_3O_{7-X}$ for decreasing $NO_x$ in the exhaust of such an engine running on a lean mixture, in combination with a three-way catalyst, was checked in a corresponding test system with a test gas which was provided instead of the real exhaust gas of the internal combustion engine (1).

Generally, the operating temperature is between room temperature and 1,000° C. Additionally, the adsorption phase temperature is preferably below 450° C. and the desorption temperature is preferably higher than 420° C. In the test system, since the exhaust gas temperature is higher at $\lambda = 1$ than at $\lambda > 1$, a temperature 180° C. higher than the adsorption temperature was used for the desorption phase. In the adsorption phase A, the temperature was 370° C. and the oxygen concentration in the gas mixture was 10%. In the desorption phase D, the temperature was 550° C. and there was no oxygen present.

The $NO_x$ and $CO_2$ curves show that by using $YBa_2Cu_3O_{7-X}$ as an adsorbent for the adsorber (3) as well as a conventional 3-way catalyst (4), the $NO_x$ concentration in the exhaust gas can be clearly decreased when the engine is running on a lean mixture. At the same time, the nitrogen oxides are stored directly in the $YBa_2Cu_3O_{7-x}$ material, so that a prior oxidation step to oxidize NO to $NO_2$ is not required. This is because the oxygen-rich orthorhombic $YBa_2Cu_3O_7$ structure changes into the oxygen-poor tetragonal $YBa_2Cu_3O_6$ structure when it is loaded with nitrogen oxides. The oxidation state of the copper is linked to the oxygen content. The change from the orthorhombic structure to the tetragonal crystalline structure therefore leads to a formal decrease in the oxidation state of copper from +3 for $YBa_2Cu_3O_7$ to +2 for $YBa_2Cu_3O_{6.5}$ to +1 for $YBa_2Cu_3O_6$. The adsorption maximum is obtained at a temperature of 350° C.

This adsorbing material described above can also be used in the process disclosed in U.S. Pat. No. 5,457,958 (counterpart of German Patent No. DE 4,319,294).

The material of the present invention makes it possible to run the desorption isothermally by changing the oxygen content of the exhaust gas. The material of the present invention is particularly suitable for use in a catalyst system for an engine running on a lean mixture. The increased exhaust gas temperature of such an engine enables perowskites, especially $YBa_2Cu_3O_{7-x}$, to be used meaningfully.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for adsorbing and desorbing nitrogen oxides in exhaust gases of an internal combustion engine of a motor vehicle operating on a lean mixture comprising the steps of adsorbing and desorbing the nitrogen oxides with a material comprising a mixed oxide containing a d element, wherein the mixed oxide has an oxygen-rich orthorhombic structure which changes into an oxygen-poor tetragonal structure as a function of temperature, and whereby the mixed oxide containing the d element binds the nitrogen oxides without a prior oxidation step during adsorption.

2. The process as claimed in claim 1, wherein the step of adsorbing the nitrogen oxide occurs at a temperature below 450° C.

3. The process as claimed in claim 1, wherein the step of adsorbing the nitrogen oxide occurs at a temperature of 370° C.

4. The process as claimed in claim 1, wherein the step of desorbing the nitrogen oxide occurs at a temperature above 420° C.

5. The process as claimed in claim 1, wherein the step of desorbing the nitrogen oxide occurs at a temperature of 550° C.

6. The process as claimed in claim 1, wherein the step of desorbing the nitrogen oxide occurs at a temperature 180° C. higher than the adsorbing temperature.

* * * * *